(12) United States Patent
Narayanan

(10) Patent No.: US 7,779,152 B2
(45) Date of Patent: Aug. 17, 2010

(54) ESTABLISHING COMMUNICATION TUNNELS

(75) Inventor: Ram Gopal Lakshmi Narayanan, Woburn, MA (US)

(73) Assignee: Nokia Corporation, Espoo (FI)

( * ) Notice: Subject to any disclaimer, the term of this patent is extended or adjusted under 35 U.S.C. 154(b) by 1532 days.

(21) Appl. No.: 10/637,648

(22) Filed: Aug. 11, 2003

(65) Prior Publication Data

US 2004/0148430 A1 Jul. 29, 2004

Related U.S. Application Data

(60) Provisional application No. 60/442,062, filed on Jan. 24, 2003.

(51) Int. Cl.
G06F 15/16 (2006.01)
G06F 15/173 (2006.01)
(52) U.S. Cl. ........................ 709/238; 709/227
(58) Field of Classification Search ............... 370/351; 709/238, 227, 228, 239, 240
See application file for complete search history.

(56) References Cited

U.S. PATENT DOCUMENTS

| | | | | |
|---|---|---|---|---|
| 5,465,251 A | * | 11/1995 | Judd et al. | 370/351 |
| 5,740,374 A | * | 4/1998 | Raffali-Schreinemachers | 709/238 |
| 6,101,543 A | * | 8/2000 | Alden et al. | 709/229 |
| 6,189,039 B1 | * | 2/2001 | Harvey et al. | 709/232 |
| 6,556,584 B1 | * | 4/2003 | Horsley et al. | 370/465 |
| 6,571,289 B1 | * | 5/2003 | Montenegro | 709/227 |
| 6,574,214 B1 | * | 6/2003 | Khalil et al. | 370/349 |
| 6,651,105 B1 | * | 11/2003 | Bhagwat et al. | 709/239 |
| 6,711,147 B1 | * | 3/2004 | Barnes et al. | 370/338 |
| 6,751,729 B1 | * | 6/2004 | Giniger et al. | 713/153 |
| 6,760,330 B2 | * | 7/2004 | Tahan | 370/389 |

(Continued)

FOREIGN PATENT DOCUMENTS

WO    WO 01/05171 A    1/2001

OTHER PUBLICATIONS

Mink, et al., "FATIMA: A Firewall-Aware Transparent Internet Mobility Architecture"; IEEE, Jul. 3, 2000, pp. 172-179.

(Continued)

Primary Examiner—Aaron Strange
(74) Attorney, Agent, or Firm—Mintz, Levin, Cohn, Ferris, Glovsky and Popeo, P.C.

(57) ABSTRACT

A method for establishing a secure communications tunnel between a first node and a second node in a communication system includes a plurality of networks each having a respective tunnel control entity for controlling establishment of secure communications tunnels in the respective network. The first node operates in a first one of the networks and the second node operates in a second one of the networks. The method includes determining a route for the communications tunnel from the first network to the second network by way of one or more of the other networks. A request message digitally signed by the first node is formed and the identities of the tunnel control entity of the first network and the tunnel control entities of the other networks are included. The request message from the first node to the tunnel control entity of the second network is transmitted. In response to that message, the secure communication tunnel is established between the first node and the second node by way of the tunnel control entities identified in that message.

13 Claims, 4 Drawing Sheets

U.S. PATENT DOCUMENTS

| | | | | |
|---|---|---|---|---|
| 6,954,435 | B2* | 10/2005 | Billhartz et al. | 370/252 |
| 7,062,566 | B2* | 6/2006 | Amara et al. | 709/229 |
| 2002/0016926 | A1* | 2/2002 | Nguyen et al. | 713/201 |
| 2002/0133534 | A1* | 9/2002 | Forslow | 709/200 |
| 2003/0005328 | A1* | 1/2003 | Grewal et al. | 713/201 |
| 2003/0140223 | A1* | 7/2003 | Desideri | 713/153 |
| 2003/0212907 | A1* | 11/2003 | Genty et al. | 713/201 |
| 2004/0008645 | A1* | 1/2004 | Janevski et al. | 370/331 |
| 2004/0037260 | A1* | 2/2004 | Kakemizu et al. | 370/338 |
| 2004/0047308 | A1* | 3/2004 | Kavanagh et al. | 370/328 |
| 2004/0252653 | A1* | 12/2004 | Shimizu et al. | 370/310 |
| 2006/0080441 | A1* | 4/2006 | Chen et al. | 709/225 |

OTHER PUBLICATIONS

Molva, et al., "Internet Security Architecture", Computer Networks, vol. 31, No. 8, Apr. 23, 1999, pp. 787-804.

Perkins, ; "IP Mobility Support for IPv4", Internet Engineering Task Force, XP-002281052, Network Working Group, Aug. 2002.

Xenakis, et al., "Dynamic Network-Based Secure VPN Deployment in GPRS", IEEE, vol. 3, Sep. 15, 2002.

Fluhrer, S., Cisco Systems, IPSP Working Group, Internet Draft, "Tunnel Endpoint Discovery", Nov. 7, 2001, pp. 1-5.

Richardson, M., et al., spsystems, Network Working Group, Internet Draft, "A Method for Doing Opportunistic Encryption with IKE", Jul. 20, 2001, pp. 1-32.

Katz, D., Cisco Systems, Network Working Group, "IP Router Alert Option", Feb. 1997, pp. 1-5.

Doraswamy, Naganand, et al., "IPSec The New Security Standard for the Internet, Intranets and Virtual Private Network", Prentice Hall, 1999.

* cited by examiner

ESTABLISHING COMMUNICATION TUNNELS

REFERENCE TO RELATED APPLICATIONS

This application claims priority of U.S. Provisional Patent Application Ser. No. 60/442,062, entitled "Establishing Communication Tunnels," filed on Jan. 24, 2003, the contents of which are hereby incorporated by reference.

BACKGROUND OF THE INVENTION

1. Field of the Invention

This invention relates to establishing communication tunnels. It is particularly applicable to establishing secure tunnels, for example IPsec tunnels through VPN (Virtual Private Network) gateways 2. Description of the Related Art The IPsec protocol provides basic security services that can be supplemented onto plain IP (Internet Protocol) traffic between two endpoints. Security Associations (SA) between the endpoints of the IPsec link are established either by manual or automatic keying processes. A general discussion of IPsec is available from "IPsec The New Security Standard for the Internet, Intranets and Virtual Private Network", PHI, Naganand Doraswamy, et al.

VPNs are often used to connect intranets or to form an extranet over the Internet. VPN tunnels are normally implemented as IPsec sessions: a VPN endpoint, based on the security policy, acts on the plain IP traffic and applies confidentiality (ESP, encapsulating security payload) or integrity (AH, authentication header). The receiving security gateway performs the reverse process. Implementation of IPsec is a receiver-oriented operation, meaning that the receiving end should have all the necessary knowledge of how to decrypt the packet and what keys are to be used to decrypt and validate against the policy. All this information has to be in place beforehand at the receiving tunnel endpoint and this is either done manually or by using IKE (internet key exchange).

There are generally two ways in which an IPsec link can be implemented. These are illustrated in FIG. 1. In method A, a client terminal 1 establishes the IPsec link directly between itself and a remote terminal 2 over an intervening network 3, which is generally a public network such as the Internet. In method B, the client terminal connects to a security gateway (SG) 5 through a local network 4, and the security gateway establishes the IPsec link between itself and the remote terminal 2. The security gateway may have pre-established the IPsec link. In method B the terminal 1 needs to know the address of the security gateway 5 so that it can connect to it. The terminal 1 may establish a secure communication session with the security gateway 5, especially if the network 4 is insecure.

Method A is often known as a "road warrior" set-up. Method B is generally used for interconnecting corporate local area networks over an intervening public network such as the Internet.

In method A the client terminal 1 must support the processing to terminate the IPsec link. It may use either pre-shared secret keys or perform IKE (internet key exchange) to establish the session keys. This requires a considerable amount of processing power, and whilst it is suitable for devices such as laptop personal computers, it is generally unsuitable for devices such as mobile phones, PDAs (personal digital assistant) and other small portable devices that typically have less processing capacity, less memory and less battery storage. Such devices may have problems supporting VPN client applications; or it may not be possible for such devices to use many IPsec sessions to perform host-to-host or host-to-network VPN tunnels.

In typical applications, IPsec is used to provide remote access to a corporate network, which could be represented by or located behind remote terminal 2. To provide remote access to a corporate network, the VPN client application software is either pre-programmed into the client terminal (for method A), or the client terminal is made aware of the address of the security gateway (for method B). As indicated above, trust can be pre-established between the security gateway and the remote terminal 2 (which could be another security gateway).

Most corporate access systems provide their own VPN application to run on the client for providing remote access, using method A. A user of such system launches and connects to the nearest (or indeed any available) remote security gateway (equivalent to remote terminal 2) in order to gain access to the cooperate network. This may not possible for small hand held devices like mobile phone, PDAs and other portable equipment due to their limited processing, memory and energy storage capabilities.

There is an additional problem in using network-to-network VPNs when one of the IP endpoints is mobile. This is illustrated in FIG. 2. FIG. 2 shows a scenario where a VPN tunnel using IPsec has been established over a 3G UMTS/W-CDMA (Universal Mobile Telecommunications System/ Wideband Code Division Multiple Access) network. A mobile node (MN) 10 is currently corresponding with a correspondent node (CN) 11. The MN is attached to an autonomous system (AS) AS1. The AS1 may be a wireless local area network (LAN) or an extranet or another network. The CN is part of another autonomous system, AS6, and further autonomous systems AS2 are also provided. AS1, AS2 and AS6 are here acting as sub autonomous systems and with AS3 form a transit network. There is a VPN tunnel 12 established between security gateway SG-1 in AS1 and security gateway SG-3 in AS6. That tunnel may be either pre-established or created specific for a certain session between the MN and the CN. Now, if the MN switches from AS-1 to AS-2, for example because MN physically moves from the coverage area of AS1 to the coverage area of AS2, the previous security associations may not be valid, and new security associations may have to be re-established from SG-2 of AS2 to SG-3 of AS6. This requires additional signalling, and may involve re-establishing the whole session between the MN and the CN. Alternatively, AS1 could tunnel all the relevant packets all the way to the MN, but this is likely to cause additional overhead in processing the IP packets at the MN; and would involve a route of AS2-AS1-AS6, which is clearly non-optimal and wastes both bandwidth and processing power of the MN and the security gateway.

Another problem that can arise for mobile nodes is that when a mobile node is turned on it does not know where it is, and so it does not know the address of the nearest security gateway.

Tunnel endpoint discovery, as identified above, partially addresses these problems as it proposes that there is a pre-established trust relationship between the two end-point security gateways or that the security gateway nearer to the remote node somehow knows the pre-established security policy and can perform IKE to establish the security association. The proposal cited above does not indicate how security policies with respect to the remote node can be added to the security gateway. The proposal might work for manually configured security gateways, but it would not scale well for IP mobility solutions. In addition, if both ESP (encapsulating security payload) and AH (authentication header) were applied at the same tunnel endpoint, then confidentially and integrity are satisfied only towards the other endpoint and there is no way to specify or detect multilateral and multilevel SAs.

There is therefore a need for an improved way of establishing communication tunnels, especially to address the problems discussed above in relation to mobile terminals.

SUMMARY OF THE INVENTION

The invention is directed to a method for establishing a secure communications tunnel between a first node and a second node in a communication system. The communication system includes a plurality of networks each having a respective tunnel control entity for controlling establishment of secure communications tunnels in the respective network. The first node operates in a first one of the networks and the second node operates in a second one of the networks. The method includes determining a route for the communications tunnel from the first network to the second network by way of one or more of the other networks. A request message digitally signed by the first node is formed and the identities of the tunnel control entity of the first network and the tunnel control entities of the other networks are included. The request message is transmitted from the first node to the tunnel control entity of the second network is established. In response to that message, the secure communication tunnel is established between the first node and the second node by way of the tunnel control entities identified in that message.

Preferably the tunnel control entity of the second network stores for the duration of the tunnel the identities of the tunnel control entities identified in the message.

Preferably the communication system includes a key server that stores a secure communication key for each of the tunnel control entities, wherefrom the tunnel control entity of the second network may retrieve a secure communication key for any of the tunnel control entities identified in the message, and thereby establish a secure communication tunnel to that entity.

Preferably the step of determining a route comprises repeatedly: forming and digitally signing at the first node a request message requesting establishment of a secure communications tunnel from the first node to the second node and including the identity of each tunnel control entity that has transmitted its identity to the first node in a previous iteration of these steps; transmitting the request message from the first node to one of the tunnel control entities identified in the message; determining at the said one of the tunnel control entities another of the networks that is on a communication path from the network that has the said one of the tunnel control entities to the network in which the second node is operating; transmitting from the said one of the tunnel control entities to the tunnel control entity of the other of the networks a message indicating the request for establishment of a secure communications tunnel from the first node to the second node; and transmitting from the tunnel control entity of the other of the networks to the first node the identity of that tunnel control entity.

Preferably the method comprises: detecting that the first node has been or is to be handed over from the first network to a third one of the networks; informing the tunnel control entity of the third network of the communication tunnel from the first node to the second node; and determining a route for the communications tunnel from the third network to the second network by way of one or more of the other networks.

Preferably the first network is a local area network, most preferably a wireless local area network. Preferably at least one of the networks on the route from the first network to the second network is a UMTS/3G network.

The or each request message may be a message having its route alert option set.

The first node may be a wireless communication terminal.

The tunnel may be a virtual private network tunnel.

The tunnel may be secured using the IPsec protocol.

It should be noted that these preferred features are exemplary only, and are not considered to be essential features of the present invention.

The invention also includes a communication system including a plurality of networks each having a respective tunnel control entity for controlling establishment of secure communications tunnels in the respective network. A first node operates in a first one of the networks and a second node operates in a second one of the networks. The communication system is capable of supporting a secure communications tunnel between the first node and the second node. The communication system includes means for determining a route for the communications tunnel from the first network to the second network by way of one or more of the other networks. Forming means form a request message digitally signed by the first node and including the identities of the tunnel control entity of the first network and the tunnel control entities of the other networks. Transmitting means transmit the request message from the first node to the tunnel control entity of the second network. Establishing means, in response to that message establish the secure communication tunnel between the first node and the second node by way of the tunnel control entities identified in that message.

The invention also includes a tunnel control entity for controlling establishment of secure communications tunnels in a network comprised in a communication system. The tunnel control entity is arranged to, in response to receiving from another entity a request for establishment of a communication tunnel by way of the network, transmit to the other entity the identity of the tunnel control entity. In response to receiving a request for establishment of a communication tunnel from the network to another network of the communication system, a route for the communications tunnel is determined from the first network to the second network by way of one or more of the other networks.

BRIEF DESCRIPTION OF THE DRAWINGS

The present invention will now be described by way of example, with reference to the accompanying drawings.

DETAILED DESCRIPTION OF THE PREFERRED EMBODIMENTS

Figure 1:
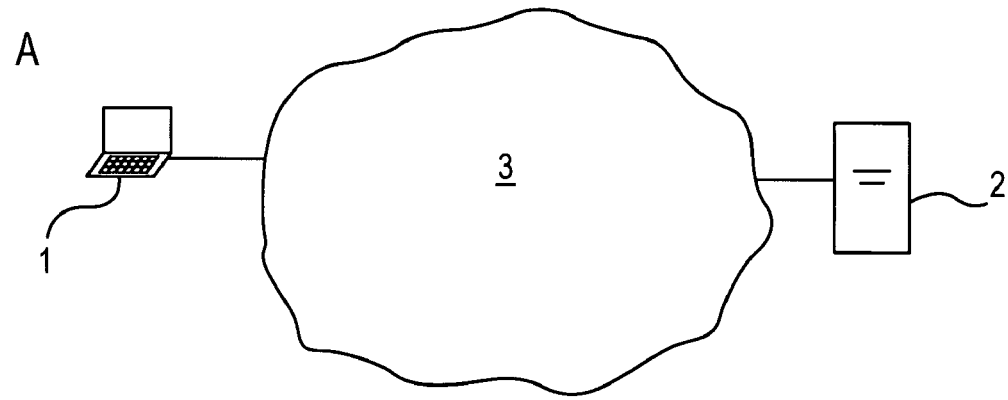
FIG. 1 shows methods for implementing IPsec connections.
Figure 1:
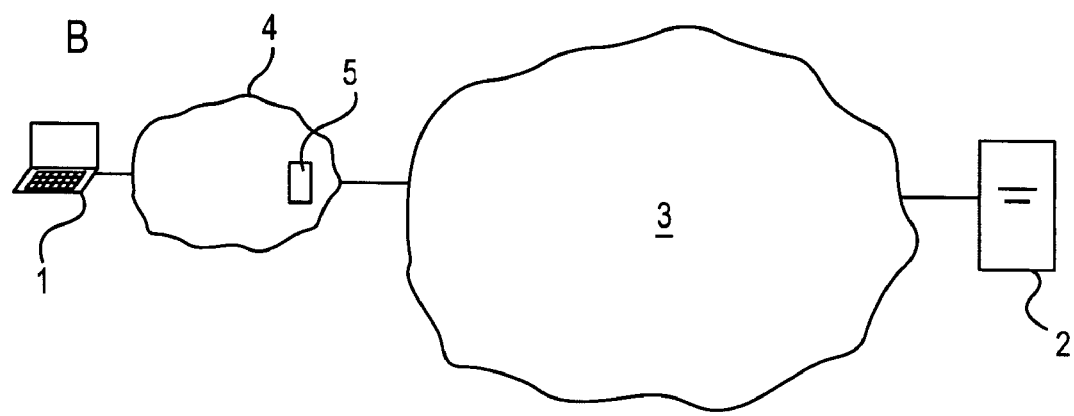
Figure 2:
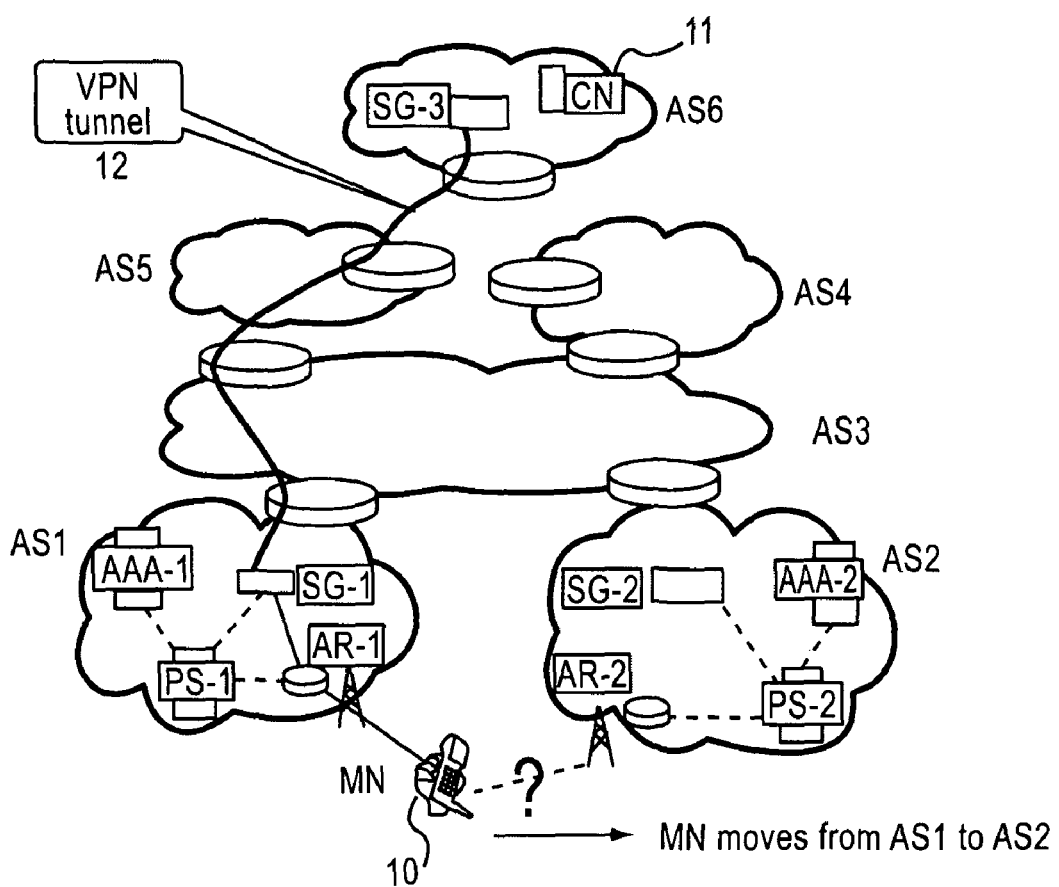
FIG. 2 shows a scenario where a VPN tunnel using IPsec has been established over a 3G/UMTS/W-CDMA network.
Figure 3:
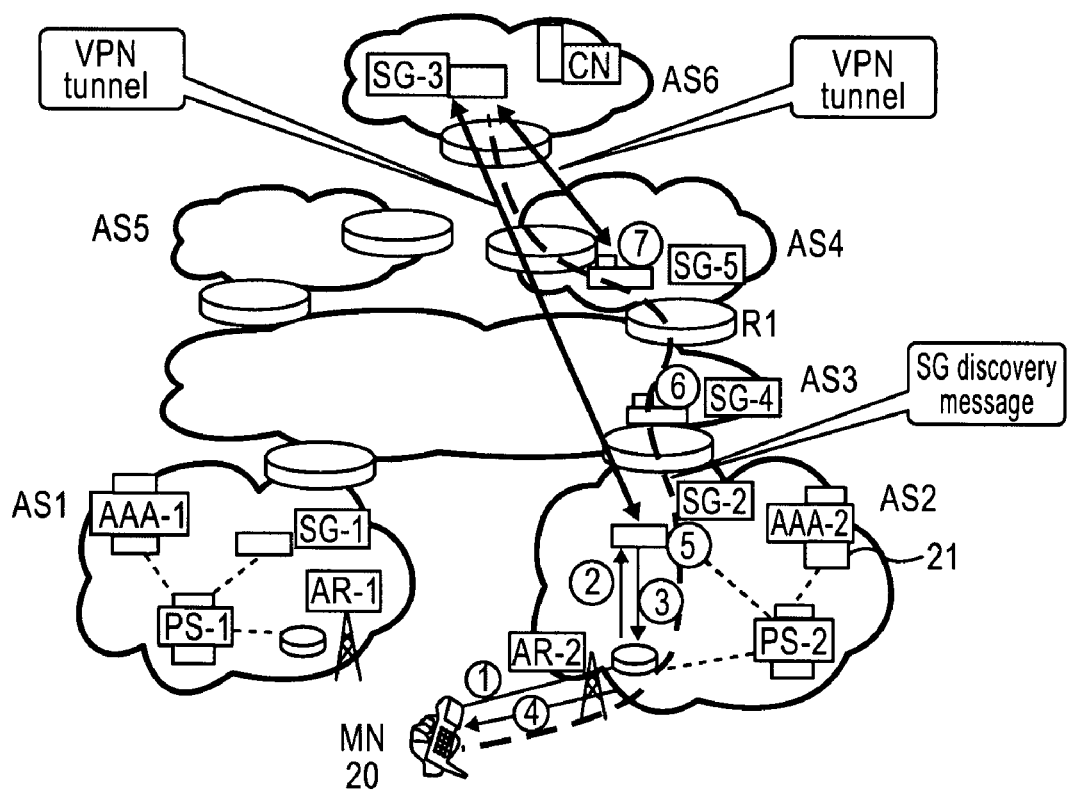
FIG. 3 shows an illustration of a first embodiment of the invention.

FIG. 3 shows a communication system that includes a plurality of networks AS1-AS6. The networks act as autonomous subsystems of an overall communication system. Each network includes a security gateway SG1-6, which has among its functions the control of secure communication tunnels running to and from (and therefore also through) the network. The security gateway can therefore act as a tunnel control unit. A mobile node 20, which in this example is a wireless communication terminal, is in communication with the network AS2. The mobile node can move to the coverage of other ones of the networks, such as network AS1, in which case it may be handed over to such another network. Network AS6 includes a correspondent node CN. In the examples to be discussed below, the mobile node (MN 20) wishes to establish a secure communications tunnel to the CN. One example of such a situation is if the mobile node wishes to establish a VPN connection to the CN.

To illustrate the present invention three exemplary scenarios will be described:

Case 1. A security gateway being discovered where the MN is turned on (or otherwise begins looking for a security gateway);

Case 2. A security gateway being discovered during or before handover;

Case 3. There being no security gateway on the path between MN and CN.

Case 1: Security Gateway Being Discovered Where the MN is Turned On

This case is described with reference to FIG. 3.

This case relates to a situation where an MN is turned on and then requires a VPN tunnel to access its corporate network. After initial authentication and authorization of the MN 20 to an access subsystem AS2, the AAA (access, authentication and accounting) unit 21 of AS2 and the policy server PS2 of AS2 are informed about the MN's profile. The MN is currently attached to an access router AR of AS2—this is a conventional access router which does not perform any security gateway functions. Suppose the MN now requires a VPN tunnel to access its corporate network AS6. The MN has to first discover the security gateway most convenient to AR and should designate that as one of the tunnel endpoints. This involves the following steps:

a. finding a security gateway on the path between MN and the corporate network, b. building a trust relationship between the MN and that security gateway, and between that security gateway and any other security gateways on the route.

In the present example, the following message sequence takes place in order to discover and establish the security association (SA) between the remote SG-2 (SG in this example) and the corporate SG (SG-3 in this example).

1. The MN generates a "FIND_LOCAL_SECURITY_GATEWAY" message with route alert option set. The source address in the packet containing this message is the address of the MN and the destination is the CN's address; and as a result of this the AR can, if necessary, determine the most convenient SG. This message is received by the access router AR. AR may contact PS and/or AAA to verify whether the MN is authorized to use the VPN service while it is roaming in AS2. If the MN is not so authorized then the AR will report an error message to the MN, for example: "NO_VPN_SERVICE" or "NO_PROFILE".

2. Provided the MN is authorized to use the VPN service in AS2, the procedure continues. AR performs IP forwarding of the packet sent from the MN towards its destination, i.e. through the identified most convenient SG, in this case SG2.

3. The security gateway SG2 that is on the path between AR and the border router will receive and intercept this packet.

4. The security gateway SG2 will parse the information and extract the CN's IP address (or other tunnel endpoint IP address). Now the SG2 will respond to the MN request by inserting an AS number and its own IP address. This message may be optionally signed by the SG2 if global PKI (Public Key Infrastructure) is available.

5. After receiving the SG2 endpoint information, the MN prepares a packet "SG-ENDPOINT-MESSAGE" by signing with its private key.

It should be noted that the CN could distribute a PKI to each user, and so to each MN that is to connect over a tunnel. Another possibility is that each MN could have its own private key/public key and may get registered with a centralized entity like DNSsec (Domain Name System Security) that can be used as central source for validating the keys. For the purpose of discovery of a suitable SG, the MN can sign the message transmitted at step 1 with its own key and the SG, SG3 the corporate network can validate this. The present description relates to the example of corporate level PKI.

Figure 4:
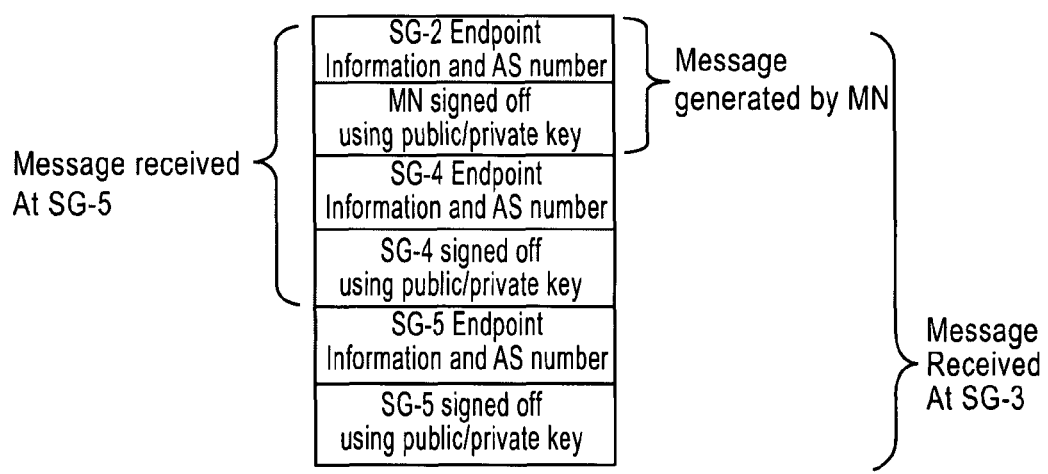
FIG. 4 shows a structure of a message.
Figure 4:
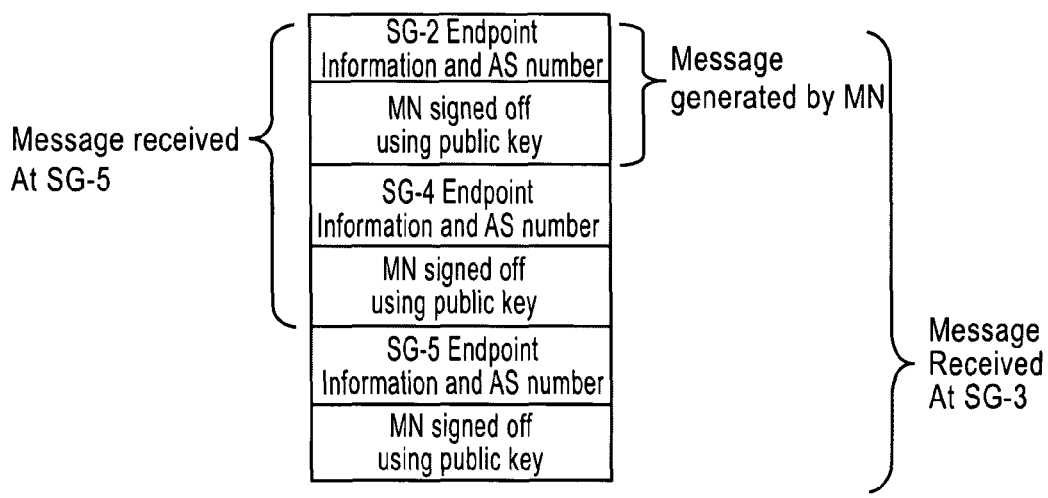

6. The signed message from the MN will follow the normal IP path from the MN to the CN. As indicated above, this message will have the route alert option enabled. Transit ASs through which the message passes along its path (e.g. AS3 and AS4 in this example) may have their own security gateways. Each security gateway appends its own transport address and its AS number and signs off the resulting message before forwarding it to the next hop towards the destination. For example as shown in FIG. 3 SG2, SG4 and SG6 will successively sign off the message to form final message as received at SG3. FIG. 4 illustrates the format of the message as received. This comprises the message as generated and sent by the MN, which is made up of an indication of the endpoint SG2 and the AS number; together with a section appended by SG4, which identifies SG4 as an endpoint and is similarly signed off; and together with a section appended by SG5 which identifies SG5 as an endpoint and is similarly signed off. Thus each security gateway through which the packet passes beyond the one to which the MN contacts directly adds its identification to the packet. Note that in this example the SG2 transport and endpoint information is signed by the MN and not by SG2. The SG2 could optionally sign this again itself but this would not have an impact on the subsequent processing at SG3 (the other endpoint of the tunnel).

7. When the message is received at SG3 it extracts the AS information and validates the transport address of each SG identified as an endpoint in the message. For this the SG can use either a global PKI repository (if such is available) or it can use a routing policy specification language (RPSL) repository to retrieve the keys, or it can use opportunistic IPsec. Having done this the SG3 knows all the information it needs to form a tunnel to each security gateway information on the path between the MN and the CN. The SG3 can now perform IKE with one or more of those SGs in order to support multilevel or multilateral SAs. As shown in FIG. 3, IKE is performed between SG3 and SG2 and also between SG3 and SG4 for the same IP session. Now SG3 and SG4 are the two ultimate endpoints of the tunnel.

Case 2: Security Gateway Being Discovered During or Before the Handover

When the MN is being handed over from one AS to another, this will result in a change in the MN's point of attachment to the network, and thus in a change of the path from the MN to the CN. In this event the SG in the AS to which the MN was attached before handover ("old SG") can forward data (e.g. in a packet) to the SG in the AS to which the MN is handed over ("new SG") (or to that AS itself). That data can include details of a tunnel that has already been established from the MN to a CN, and using that data the new SG can perform SG discovery on behalf of the MN. That data should include an indication that the tunnel exists from the MN, and an identification of the other endpoint of the tunnel. Thus in a similar way to that described above in steps 6 and 7 the new SG can establish a tunnel from itself to the other endpoint without intervention from the MN. In the course of this the CN will receive the "SG-ENDPOINT-MESSAGE" from the new SG and can consequently update its bindings for the tunnel to the MN. Having done so the CN will start using the newly set-up route and send the packets directly to the new SG. Until Ten the packets carried over the tunnel may be tunnelled through the old SG without using the new route.

Case 3: No Security Gateway On the Path Between MN and CN

If in FIG. 3 there were no security gateway SG, then when the MN wanted to discover a SG and generated a "FIND_LO-CAL_SECURITY_GATEWAY" message, since there would be no security gateway in AS2, the border gateway (e.g. AR) which received such a message would reject the packet and send an internet control message protocol (ICMP) error message back to the MN. Thus if there is no security gateway in the domain in which the MN is attached such a discovery message will not reach the Internet. This helps to increase security.

The above method may make use of the IPsec opportunistic mechanism described in "A method for doing opportunistic encryption with IKE", draft-richardson-ipsec-opportunistic-06.txt, IETF, February 2002, M. Richardson, et al., the router alert option described in "IP Router Alert Option", RFC 2113, IETF, February 1997, D. Katz and may make use of BGP (border gateway protocol) AS (autonomous system) numbering path information to establish the security association between corporate security gateway and another other security gateway in the internet.

The system described above can provide the following advantages:

a. The system can support both multilateral and multilevel SA. Thus, in the situation where a mobile user is using a terminal device (MN) that supports the system described herein, and has VPN client software running on it, he can use that VPN client software to contact his corporate network. (See FIG. 3) The MN and the corporate network (SG-3) are the two IPsec endpoints (IPsec transport mode) and the message may be protected by an integrity or/and confidentially service. Even if the MN could perform the IPsec function it would not solve the problem. In IPsec, packets headers are of the IP header form. An attacker on the path can come to know that there is a secured communication between an MN and a corporate network SG-3. The attacker can generate a few false IPsec packets or duplicate a sniffed packet towards the MN. Since the MN has limited energy resource the battery will eventually run down. To avoid this, the MN needs to designate a security gateway in its connected network. The designated security gateway (say FIG. 3, SG-2) will take the packets from the MN and put them inside another IP packet (i.e. IP-in-IP tunnelling, IPsec Tunnel Mode) and encrypts the packet. Now the attacker can see the plain IP text header, but it just contains the identification of the corporate SG-3 and the SG-2 endpoint. Since SG-2 is a powerful device, if the attacker sends a false packet to SG-2, the SG-2 can comfortably reject all the bad packets and only send the valid packets to the MN.

b. The system can utilize the underlying routing infrastructure to verify and validate the trust relationship and the path. This means that there is no need to overhaul these methods in order to implement the present system.

c. The system can be compatible with both IPv4 and IPv6 networks.

d. The remote security gateways (SG4 and SG) do not need to be reconfigured to support the protocol, so one or more security gateways might participate in the discovery process.

e. Discovery packets that cannot be handled in the local autonomous system where they are generated (which require confidentiality or integrity) will not be routed to the Internet.

f. Where appropriate the system can make use of existing signalling mechanisms such as the RSVP type of route alert option, IPsec opportunistic mode and PKI based schemes.

The discovery of a suitable SG may occur when the node is turned on, or at another time, for example when it comes into communication range of the AS, or when a tunnel is to be established.

The present invention can be used outside the environments described above. For example, the end-points need not communicate over a publicly accessible network such as the Internet. Different protocols can be used for transporting the data and securing the tunnel. Neither of the end-points needs to be mobile, although as indicated above the system is especially advantageous when applied to mobile systems. Where an endpoint is mobile, it is preferably capable of communicating with its local autonomous network by wireless means, for example by radio or infrared.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:

determining a route for a secure communications tunnel from a first network to a second network by way of two or more other networks, wherein a first node is configured to operate in the first network and a second node is configured to operate in the second network;

forming a request message, wherein a portion of the request message is digitally signed by the first node, wherein the request message is configured to comprise an identity of a tunnel control entity of the first network and at least two identities each of which identifies another tunnel control entity in another network, wherein the forming comprises forming the request message comprising a set route alert;

transmitting the request message to the tunnel control entity of the second network; and in response to the request message, establishing the secure communications tunnel between the first node and the second node by way of the tunnel control entities identified in the request message.

2. A method as claimed in claim 1, wherein the transmitting comprises transmitting the request message to the tunnel control entity of the second network configured to store for a duration of the secure communications tunnel the identities of the tunnel control entities identified in the request message.

3. A method as claimed in claim 1, further comprising:

storing a secure communication key for each of the tunnel control entities, wherein the tunnel control entity of the second network is configured to retrieve a secure communication key for any of the tunnel control entities identified in the request message for establishing a secure communications tunnel to the tunnel control entity of the first network.

4. A method as claimed in claim 1, wherein the determining comprises repeatedly:
    forming and digitally signing at the first node the request message configured to request establishment of the secure communications tunnel from the first node to the second node and comprising an identity of each tunnel control entity that has transmitted its identity to the first node in a previous iteration of these steps;
    transmitting the request message from the first node to one of the tunnel control entities identified in the request message;
    determining at the one of the tunnel control entities another of the networks that is on a communication path from the network comprising the one of the tunnel control entities to the second network;
    transmitting from the one of the tunnel control entities to the tunnel control entity of another of the networks the request message indicating the request for establishment of the secure communications tunnel from the first node to the second node; and
    transmitting from the tunnel control entity of the other of the networks to the first node the identity of that tunnel control entity.

5. A method as claimed in claim 1, further comprising:
    detecting that the first node has been or is to be handed over from the first network to a third network;
    informing a tunnel control entity of the third network of the secure communications tunnel from the first node to the second node; and
    determining a route for the secure communications tunnel from the third network to the second network by way of one or more of the other networks.

6. A method as claimed in claim 1, wherein the determining comprises determining the route from the first network comprising a local area network.

7. A method as claimed in claim 6, wherein the determining comprises determining the route from the first network comprising a wireless local area network.

8. A method as claimed in claim 1, wherein the determining comprises determining the route by way of the one or more other networks comprising a universal mobile telecommunications system/3G network.

9. A method as claimed in claim 1, wherein the forming comprises forming the request message digitally signed by the first node comprising a wireless communication terminal.

10. A method as claimed in claim 1, wherein the determining comprises determining the route for the secure communications tunnel comprising a virtual private network tunnel.

11. A method as claimed in claim 1, wherein the determining comprises determining the route for the secure communications tunnel being is-secured using an interne protocol security.

12. A system comprising:
    determining means for determining a route for a secure communications tunnel from a first network to a second network by way of two or more other networks, wherein a first node is configured to operate in the first network and a second node is configured to operate in the second network;
    forming means for forming a request message a portion of which is digitally signed by the first node, the request message configured to comprise an identity of a tunnel control entity of the first network and at least two identities each of which identifies another tunnel control entity in another network, wherein the forming comprises forming the request message comprising a set route alert;
    transmitting means for transmitting the request message to the tunnel control entity of the second network; and
    establishing means for, in response to the request message, establishing the secure communications tunnel between the first node and the second node by way of the tunnel control entities identified in the request message.

13. An apparatus comprising:
    at least one processor; and
    at least one memory, wherein the at least one processor and the at least one memory provide operations comprising:
    determining a route for a secure communications tunnel from a first network to a second network by way of two or more other networks, wherein a first node is configured to operate in the first network and a second node is configured to operate in the second network;
    forming a request message, wherein a portion of the request message is digitally signed by the first node, wherein the request message is configured to comprise an identity of a tunnel control entity of the first network and at least two identities each of which identifies another tunnel control entity in another network, wherein the forming comprises forming the request message comprising a set route alert;
    transmitting the request message to the tunnel control entity of the second network; and
    in response to the request message, establishing the secure communications tunnel between the first node and the second node by way of the tunnel control entities identified in the request message.

* * * * *